(12) United States Patent
Nakaiso

(10) Patent No.: US 11,069,482 B2
(45) Date of Patent: Jul. 20, 2021

(54) CAPACITIVE ELEMENT

(71) Applicant: Murata Manufacturing Co., Ltd., Nagaokakyo (JP)

(72) Inventor: Toshiyuki Nakaiso, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 154 days.

(21) Appl. No.: 16/546,659

(22) Filed: Aug. 21, 2019

(65) Prior Publication Data
US 2020/0020482 A1 Jan. 16, 2020

Related U.S. Application Data

(63) Continuation of application No. PCT/JP2019/006944, filed on Feb. 25, 2019.

(30) Foreign Application Priority Data

Jul. 11, 2018 (JP) .............................. JP2018-131286

(51) Int. Cl.
*H05K 1/16* (2006.01)
*H01G 4/236* (2006.01)
(Continued)

(52) U.S. Cl.
CPC ............. *H01G 4/236* (2013.01); *H01G 2/103* (2013.01); *H01G 4/005* (2013.01); *H01G 4/33* (2013.01);
(Continued)

(58) Field of Classification Search
CPC ............ H01G 4/236; H01G 4/40; H01G 4/35; H01G 2/103; H01G 4/385; H01G 4/005; H01G 4/33; H01G 4/012
See application file for complete search history.

(56) References Cited

U.S. PATENT DOCUMENTS 5,777,839 A * 7/1998 Sameshima ............. H01L 28/40
257/295
6,603,161 B2 * 8/2003 Kanaya ............. H01L 27/11502
257/295
(Continued)

FOREIGN PATENT DOCUMENTS

JP H0555459 A 3/1993
JP 2008078299 A 4/2008
(Continued)

OTHER PUBLICATIONS

International Serach Report issued for PCT/JP2019/006944, dated May 14, 2019 (Japanese language).

*Primary Examiner* — Yuriy Semenenko
(74) *Attorney, Agent, or Firm* — Arent Fox LLP

(57) ABSTRACT

A capacitive element is provided that includes a substrate, a lower electrode on the substrate, first upper electrodes disposed to face the lower electrode, second upper electrodes disposed to face the lower electrode, a dielectric layer disposed between the lower electrode and the first upper electrodes and between the lower electrode and the second upper electrodes, a first wiring conductor that connects the first upper electrodes, and a second wiring conductor that connects the second upper electrodes. The first and second upper electrodes are adjacent to each other in a surface direction along the lower electrode and in an X-axis direction, and the first and second upper electrodes are adjacent to each other in the surface direction along the lower electrode and in a Y-axis direction.

20 Claims, 20 Drawing Sheets

(51) Int. Cl.
  *H01G 4/40* (2006.01)
  *H01G 4/35* (2006.01)
  *H01G 2/10* (2006.01)
  *H01G 4/38* (2006.01)
  *H01G 4/005* (2006.01)
  *H01G 4/33* (2006.01)
(52) U.S. Cl.
  CPC ............... *H01G 4/35* (2013.01); *H01G 4/385* (2013.01); *H01G 4/40* (2013.01)

(56) References Cited

U.S. PATENT DOCUMENTS

| | | | | |
|---|---|---|---|---|
| 7,174,147 | B2 * | 2/2007 | Toncich | H03H 7/0161 330/303 |
| 7,449,772 | B2 * | 11/2008 | Aoki | H01L 23/3114 257/691 |
| 8,896,092 | B2 * | 11/2014 | Takeshima | H01L 27/0248 257/530 |
| 10,424,440 | B2 * | 9/2019 | Nakaiso | H01G 4/33 |
| 10,658,111 | B2 * | 5/2020 | Hattori | H01G 9/012 |
| 10,916,378 | B2 * | 2/2021 | Komiyama | H01G 4/40 |
| 2008/0068780 | A1 * | 3/2008 | Shioga | H01G 4/008 361/524 |
| 2010/0321911 | A1 | 12/2010 | Shioga | |
| 2013/0314842 | A1 * | 11/2013 | Kang | H01G 4/06 361/303 |
| 2015/0092317 | A1 * | 4/2015 | Gabig | H01G 4/06 361/303 |
| 2015/0217111 | A1 * | 8/2015 | Stevenson | H01G 4/005 607/63 |
| 2018/0321059 | A1 | 11/2018 | Komiyama | |

FOREIGN PATENT DOCUMENTS

| | | |
|---|---|---|
| JP | 4535817 B2 | 6/2010 |
| JP | 4738182 B2 | 8/2011 |
| JP | 2014187396 A | 10/2014 |
| JP | 2017159283 A1 | 9/2017 |

* cited by examiner

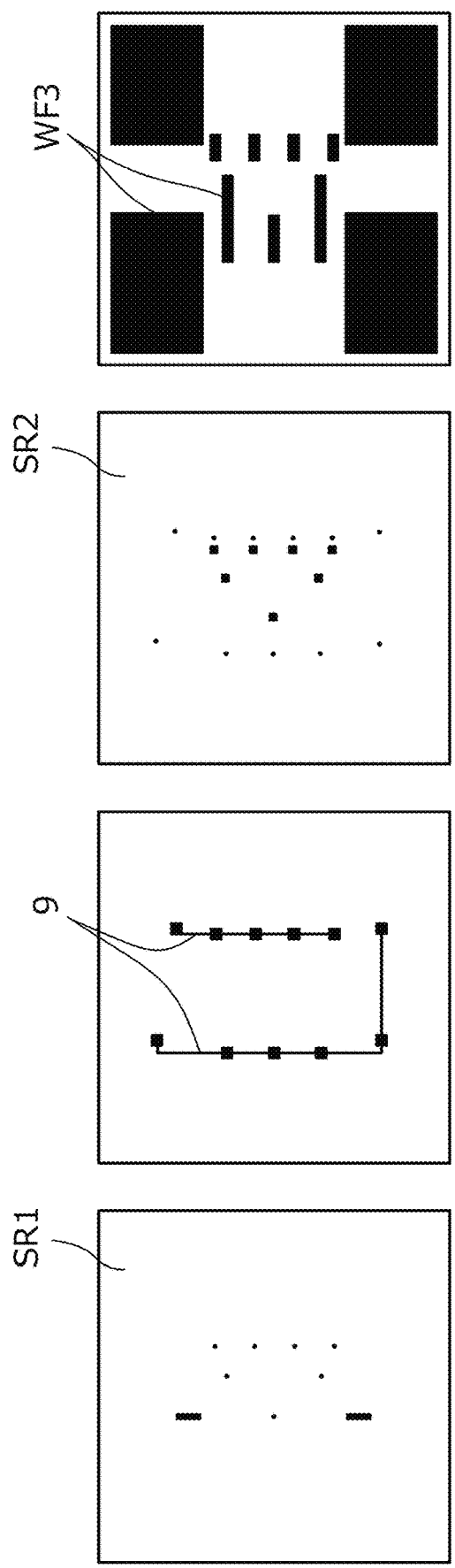

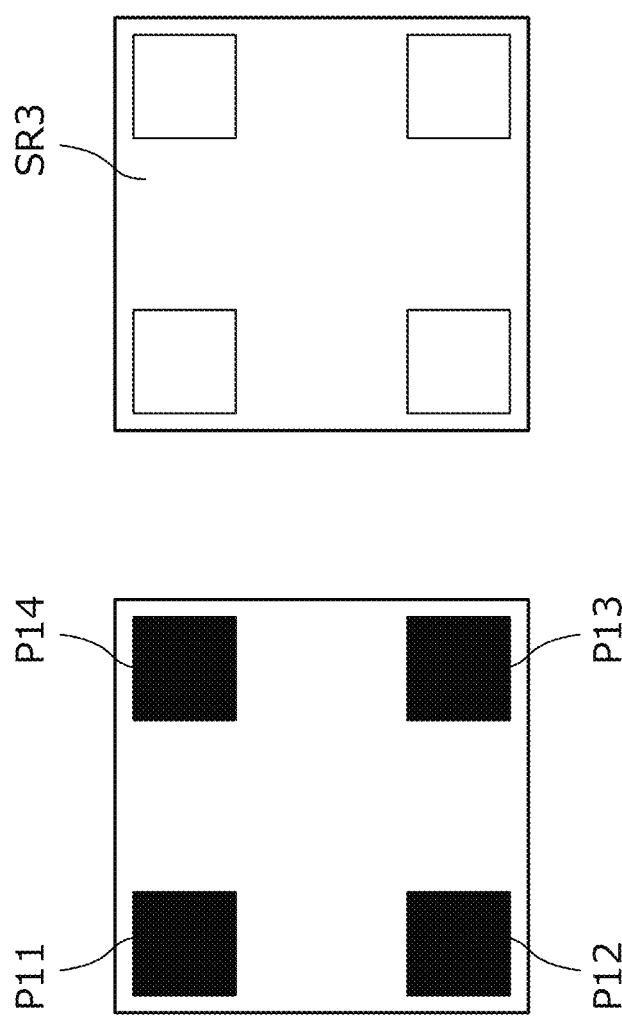

CAPACITIVE ELEMENT

CROSS REFERENCE TO RELATED APPLICATIONS

The present application is a continuation of PCT/JP2019/006944 filed Feb. 25, 2019, which claims priority to Japanese Patent Application No. 2018-131286, filed Jul. 11, 2018, the entire contents of each of which are incorporated herein by reference.

TECHNICAL FIELD

The present invention relates to a capacitive element incorporated in an electronic device, and, more particularly, to a capacitive element configured for low equivalent series resistance (ESR).

BACKGROUND

In general, a thin film capacitive element provided by a thin film process using a dielectric layer and electrodes sandwiching the dielectric layer is used for, for example, filters or matching circuits in high frequency circuits by utilizing characteristics of a small size and a low equivalent series inductance (ESL).

The thin film capacitive element in the related art has a metal-insulator-metal (MIM) structure in which a dielectric layer having high dielectric constant which is composed of perovskite-type oxide dielectric materials is sandwiched between an upper electrode and a lower electrode, as disclosed in Japanese Patent No. 4738182 and Japanese Patent No. 4535817, for example.

Since the dielectric film made of the perovskite-type oxide dielectric materials is processed at a high temperature in an oxidizing atmosphere, a platinum (Pt) thin film with excellent oxidation resistance is used for the lower electrode.

The capacitive element disclosed in Japanese Patent No. 4738182 includes a lower common electrode, and a first upper electrode and a second upper electrode that are disposed to face the lower common electrode, and the first upper electrode and the second upper electrode have a shape to intermesh with each other in order to lengthen the length of facing sides of the first upper electrode and the second upper electrode.

Moreover, in a capacitive element disclosed in Japanese Patent No. 4535817, for example, a plurality of lower electrodes are disposed on a substrate at intervals in a right and left direction, two dielectric layers are provided on at least one lower electrode of the plurality of lower electrodes at an interval in the right and left direction, and upper electrode layers are respectively provided on the two dielectric layers. In this configuration, the two upper electrode layers are disposed at an interval in the right and left direction to thereby construct two capacitance generation portions in which the dielectric layer is sandwiched between the lower electrode layer and the upper electrode layer, and extraction electrode layers are respectively and independently provided on the two upper electrode layers.

Since the thin film capacitive element has a large capacity to be obtained per volume, the thin film capacitive element can be used as a capacitor element having a small size and a high capacity. However, the equivalent series resistance (ESR) of the thin film capacitive element is a great factor in characteristics of the Q-factor and the insertion loss of the filter circuit, for example. Since in the thin film capacitive element, the Pt thin film is used for the upper electrode and the lower electrode as described above, the thin film capacitive element cannot obtain low ESR properties due to the low conductivity of the upper and lower electrodes.

FIG. 19A is a plan view illustrating a schematic structure of the capacitive element disclosed in Japanese Patent No. 4535817, and FIG. 19B is a sectional view illustrating a schematic structure of the capacitive element disclosed in Japanese Patent No. 4535817.

FIG. 20 is a view illustrating an example of an orientation of currents flowing through respective electrodes of a capacitive element having the structure disclosed in Japanese Patent No. 4535817.

In the capacitive element shown in FIGS. 19A and 19B, a plurality of lower electrodes 10 are disposed on a substrate at intervals in a right and left direction, two dielectric layers and upper electrodes 41 and 42 are provided on each lower electrode 10 at an interval in the right and left direction, so that the two upper electrodes 41 and 42 are disposed at an interval in the right and left direction, and extraction electrodes 60 are respectively and independently provided on the two upper electrode 41 and 42.

In FIG. 20, solid arrows indicate paths of actual currents and dashed arrows indicate paths of displacement currents. As illustrated in FIG. 20, a path PS of a current flowing between long sides, which are adjacent to each other and face each other, of the first upper electrode 41 and the second upper electrode 42 becomes shortest on the lower electrode, in plan view. However, a path PL of a current passing between and around long sides, which do not face each other, of the first upper electrode 41 and the second upper electrode 42 becomes longest. That is, the lengths of the current paths become uneven, and thus the distribution of the current density is biased. In other words, the area of the lower electrode is not effectively utilized, currents are concentrated to a portion where the current path is short, and thus the resistance loss at that portion is relatively large.

Since the lower electrode 10 constituting the current paths PS and PL is made of a material having high sheet resistance, if the current density is not uniform, the equivalent series resistance (ESR) that results from the lower electrode 10 cannot be sufficiently reduced. Further, since the current density of the path PS of the current flowing between the long sides which are adjacent to each other and face each other is increased, there is a problem in that the lower electrode is likely to generate heat when high frequency current is applied.

SUMMARY OF THE INVENTION

Accordingly, it is an object of the exemplary embodiments of the present invention to provide a capacitive element in which ESR is effectively reduced by devising the shape and arrangement of electrodes.

Thus, in an exemplary aspect, a capacitive element is provided that includes a substrate; a lower electrode provided on the substrate; a plurality of first upper electrodes disposed to face the lower electrode; a plurality of second upper electrodes disposed to face the lower electrode; a dielectric layer disposed between the lower electrode and the plurality of first upper electrodes and between the lower electrode and the plurality of second upper electrodes; a first wiring conductor that connects the plurality of first upper electrodes; and a second wiring conductor that connects the plurality of second upper electrodes. Moreover, the plurality of first and second upper electrodes are disposed such that the first upper electrodes and the second upper electrodes are adjacent to each other in a surface direction along the lower electrode and in a first axis direction, and the first and second upper electrodes are adjacent to each other in the surface direction along the lower electrode and in a second axis direction.

With the configuration, path lengths of current paths from a first upper electrode to the plurality of second upper electrodes adjacent to the first upper electrode are equal or similar to each other. As such, the density distribution of currents flowing through the lower electrode becomes uniform or substantially uniform. Thus, a low ESR capacitive element is obtained.

According to the exemplary aspect of the present invention, since the density distribution of currents flowing through the lower electrode becomes uniform or substantially uniform and the concentration of currents is relieved, a capacitive element in which the ESR is effectively reduced is obtained.

The above and other elements, features, steps, characteristics and advantages of the exemplary embodiments of the present invention will become more apparent from the following detailed description of the embodiments with reference to the attached drawings.

BRIEF DESCRIPTION OF THE DRAWINGS

FIG. 16A is a plan view of an interlayer insulation film SR1, FIG. 16B is a plan view of resistance elements 9, FIG. 16C is a plan view of an interlayer insulation film SR2, and FIG. 16D is a plan view of wiring conductor films WF3.

FIG. 17A is a plan view of Au/Ni plated films provided at positions of external connection electrodes P11, P12, P13, and P14, and FIG. 17B is a plan view of a solder resist film SR3.

DETAILED DESCRIPTION

Figure 1:
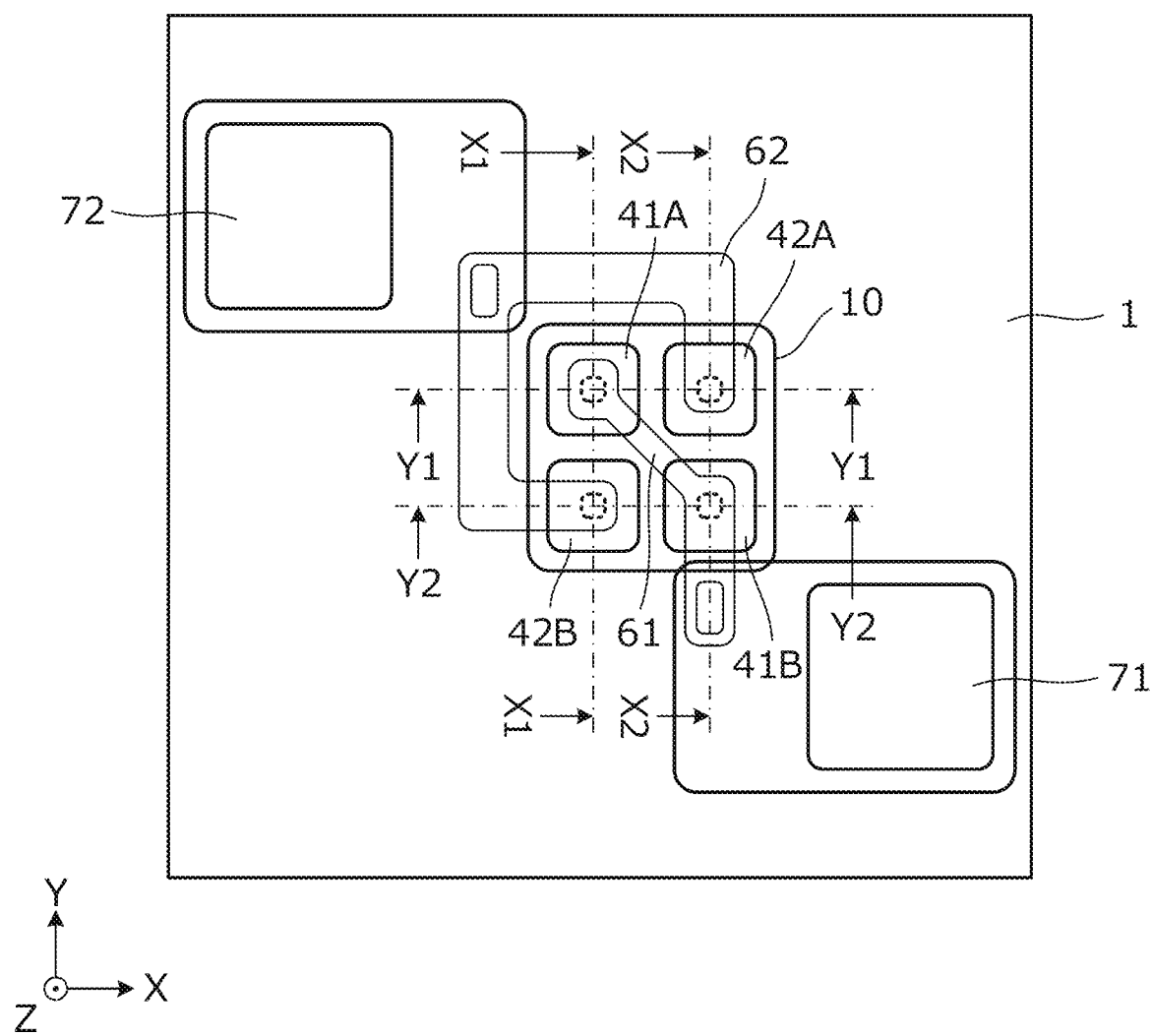
FIG. 1 is a plan view of a main portion of a capacitive element 101 according to a first exemplary embodiment.

Hereinafter, a plurality of exemplary embodiments of the present invention will be described with several specific examples with reference to the drawings. In each drawing, the same reference numerals are given to the same parts. In a second embodiment and subsequent embodiments, the description of matters common to a first embodiment is omitted, and points different from the first embodiment will be described. In particular, the same operation and effect by the same configuration will not be sequentially mentioned in the embodiments.

First Exemplary Embodiment

Figure 2A:
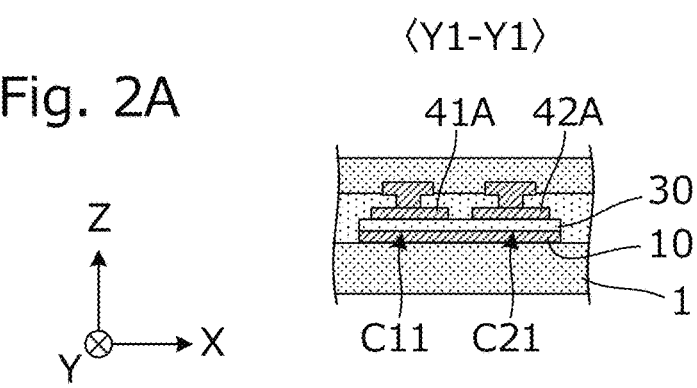
FIG. 2A is a sectional view taken along line Y1-Y1 in FIG. 1.
Figure 2B:
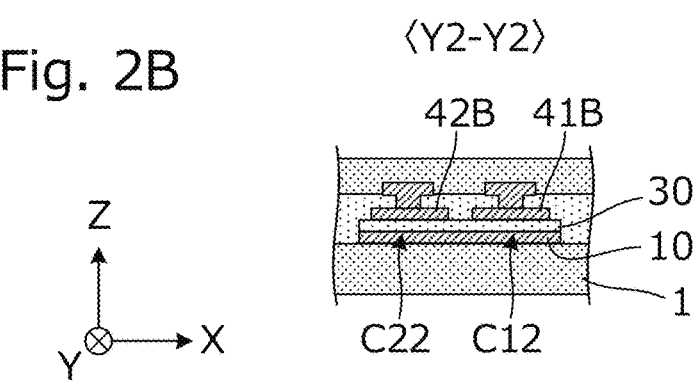
FIG. 2B is a sectional view taken along line Y2-Y2 in FIG. 1.
Figure 2C:
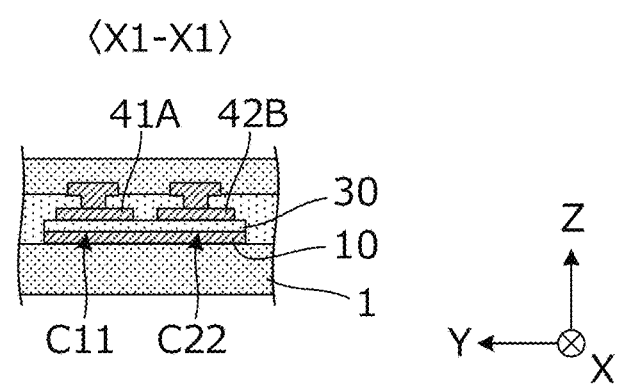
FIG. 2C is a sectional view taken along line X1-X1 in FIG. 1.
Figure 2D:
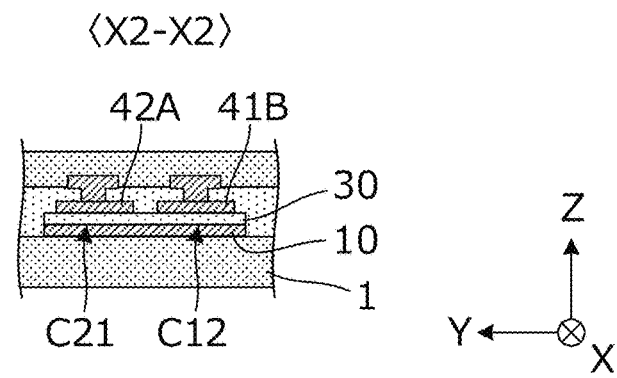
FIG. 2D is a sectional view taken along line X2-X2 in FIG. 1.

FIG. 1 is a plan view of a main portion of a capacitive element 101 according to a first embodiment. FIG. 2A is a sectional view taken along line Y1-Y1 in FIG. 1, and FIG. 2B is a sectional view taken along line Y2-Y2 in FIG. 1. FIG. 2C is a sectional view taken along line X1-X1 in FIG. 1, and FIG. 2D is a sectional view taken along line X2-X2 in FIG. 1. It is noted that FIGS. 2A to 2D illustrate a range of the capacitance generating portion.

As shown, the capacitive element 101 includes a substrate 1, and a conductor, a dielectric, an insulator, and the like that are disposed on the substrate 1. The substrate 1 has a surface extending in an X-axis direction and a Y-axis direction in an X-Y rectangular coordinate system. A lower electrode 10 is provided on the surface of the substrate 1. A dielectric layer 30 is provided on the lower electrode 10. Two first upper electrodes 41A and 41B and two second upper electrodes 42A and 42B are provided on the dielectric layer 30.

In a surface direction along the lower electrode 10, the first upper electrode 41A and the second upper electrode 42A are adjacent to each other in the X-axis direction, and similarly, the first upper electrode 41B and the second upper electrode 42B are adjacent to each other in the X-axis direction. Further, in the surface direction along the lower electrode 10, the first upper electrode 41A and the second upper electrode 42B are adjacent to each other in the Y-axis direction, and similarly, the first upper electrode 41B and the second upper electrode 42A are adjacent to each other in the Y-axis direction. According to the present disclosure, the X-axis direction corresponds to a "first axis direction", and the Y-axis direction corresponds to a "second axis direction".

In each of the first upper electrodes 41A and 41B and the second upper electrodes 42A and 42B, the width in the X-axis direction is substantially the same as the width in the Y-axis direction. Moreover, each of the first upper electrodes 41A and 41B and the second upper electrodes 42A and 42B has a roughly square shape with rounded corners. In addition, the intervals between the first upper electrodes 41A and 41B and the second upper electrodes 42A and 42B are substantially the same in the X-axis direction and in the Y-axis direction.

A first wiring conductor 61, a second wiring conductor 62, a first external electrode 71, and a second external electrode 72 are further provided on the substrate 1. A layer where the first wiring conductor 61 and the second wiring conductor 62 are provided is different from a layer where the upper electrodes 41A, 41B, 42A, and 42B are provided. Further, the layer where the first wiring conductor 61 and the second wiring conductor 62 are provided is different from a layer where the first external electrode 71 and the second external electrode 72 are provided.

The two first upper electrodes 41A and 41B are electrically connected to each other via the first wiring conductor 61 and the two second upper electrodes 42A and 42B are electrically connected to each other via the second wiring conductor 62. The first wiring conductor 61 is connected to the first external electrode 71, and the second wiring conductor 62 is connected to the second external electrode 72. The lower electrode 10 is a Pt film or a metal film mainly composed of Pt, while the first wiring conductor 61 and the second wiring conductor 62 are metal films mainly composed of a Cu layer, such as a Ti/Cu/Ti film, or metal films such as an Al film. That is, the first wiring conductor 61 and the second wiring conductor 62 have sheet resistance lower than that of the lower electrode 10. Therefore, even if the first wiring conductor 61 and the second wiring conductor 62 do not extend vertically and horizontally like the lower electrode 10, the line resistance thereof is small, and there is no substantial increase in ESR at a parallel connection portion between the first upper electrodes and a parallel connection portion between the second upper electrodes.

As illustrated in FIGS. 2A to 2D, a capacitance generating portion C11 is provided by the lower electrode 10, the first upper electrode 41A, and the dielectric layer 30, and a capacitance generating portion C12 is provided by the lower electrode 10, the first upper electrode 41B, and the dielectric layer 30. Similarly, a capacitance generating portion C21 is provided by the lower electrode 10, the second upper electrode 42A, and the dielectric layer 30, and a capacitance generating portion C22 is provided by the lower electrode 10, the second upper electrode 42B, and the dielectric layer 30.

Figure 3A:
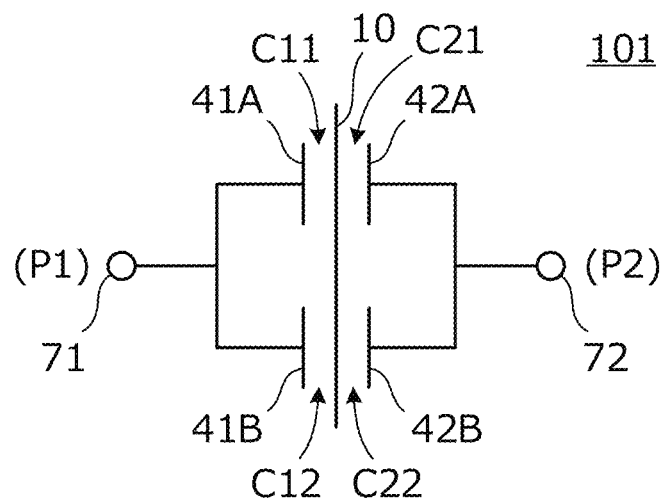
FIG. 3A is a circuit diagram illustrating a connection relationship of capacitance generating portions of the capacitive element 101.
Figure 3B:
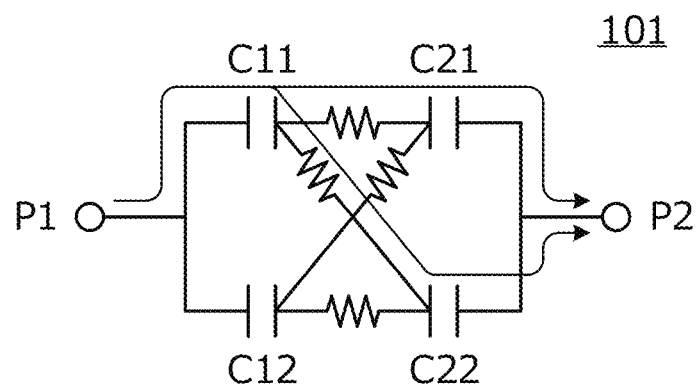
FIG. 3B is an equivalent circuit diagram in which resistance components of a lower electrode 10 are expressed as resistance elements.

FIG. 3A is a circuit diagram illustrating a connection relationship of the capacitance generating portions of the capacitive element 101, and FIG. 3B is an equivalent circuit diagram in which resistance components of the lower electrode 10 are expressed as resistance elements.

As illustrated in FIG. 3A, in the capacitive element 101, in terms of electric circuit, the capacitance generating portion C11 and the capacitance generating portion C12 are connected in parallel via the lower electrode 10 and similarly, the capacitance generating portion C21 and the capacitance generating portion C22 are connected in parallel via the lower electrode 10. Further, a parallel connection circuit of the capacitance generating portions C11 and C12 and a parallel connection circuit of the capacitance generating portions C21 and C22 are connected in series via the lower electrode 10.

Since the lower electrode 10 has lower conductivity (higher resistivity) than the first wiring conductor 61 and the second wiring conductor 62, if the lower electrode 10 is expressed as the resistance element, it is expressed, as illustrated in FIG. 3B, that one electrode of the capacitance generating portion C11 is connected to one electrode of each of the capacitance generating portions C21 and C22 through resistance, and one electrode of the capacitance generating portion C12 is connected to one electrode of each of the capacitance generating portions C21 and C22 through resistance. Here, the first external electrode 71 is expressed as a port P1, and the second external electrode 72 is expressed as a port P2.

In this manner, current is dispersed in and flows through the lower electrode 10. That is, the concentration of currents is relieved, and thus a capacitive element is provided in which the ESR is effectively reduced.

In particular, since the intervals between the first upper electrodes 41A and 41B and the second upper electrodes 42A and 42B are substantially the same in the X-axis direction and in the Y-axis direction, current is easily dispersed in and flows through the lower electrode 10 in any of the X-axis direction and the Y-axis direction, and a reduction effect of the ESR is high.

Figure 4A:
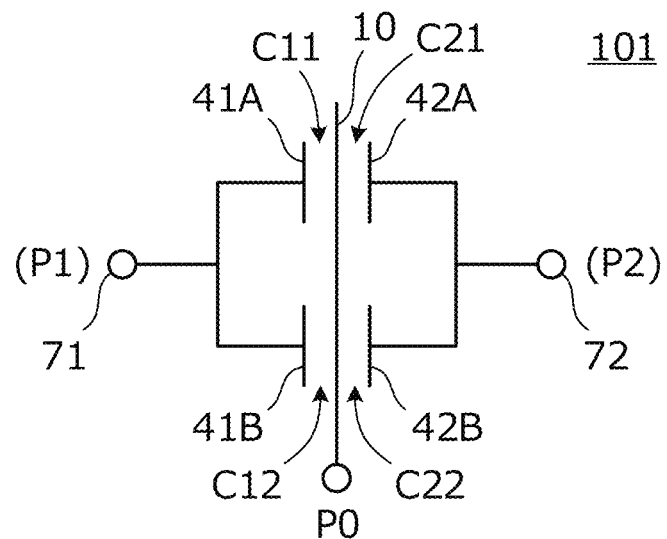
FIGS. 4A and 4B are circuit diagrams of a structure in which the lower electrode is connected to another circuit part.
Figure 4B:
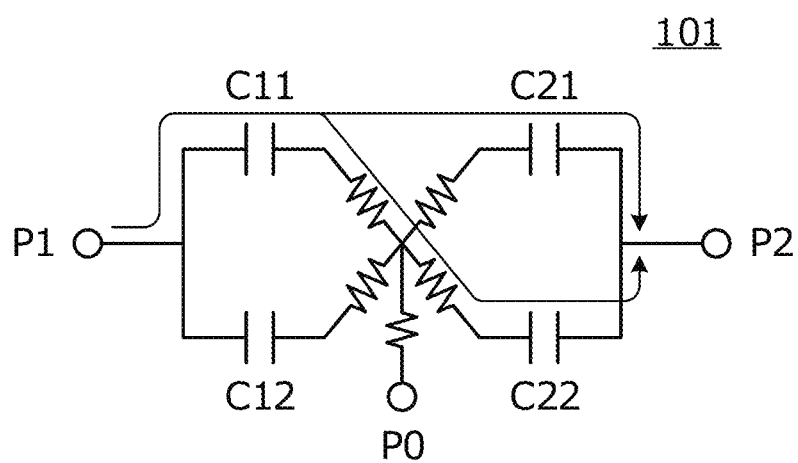

FIGS. 4A and 4B are circuit diagrams of a structure in which the lower electrode is connected to another circuit part. FIG. 4A is a circuit diagram illustrating a connection relationship of the capacitance generating portions of the capacitive element 101, and FIG. 4B is an equivalent circuit diagram in which resistance components of the lower electrode 10 are expressed as resistance elements.

In the example illustrated in FIG. 4A, a port P0 connected to another circuit part such as a resistance element is drawn out from the lower electrode 10. In such a capacitive element, it is expressed, as illustrated in FIG. 4B, that one electrode of the capacitance generating portion C11 is connected to one electrode of each of the capacitance generating portions C21 and C22 through resistance, one electrode of the capacitance generating portion C12 is connected to one electrode of each of the capacitance generating portions C21 and C22 through resistance, and the port P0 is further connected through resistance.

Figure 5:
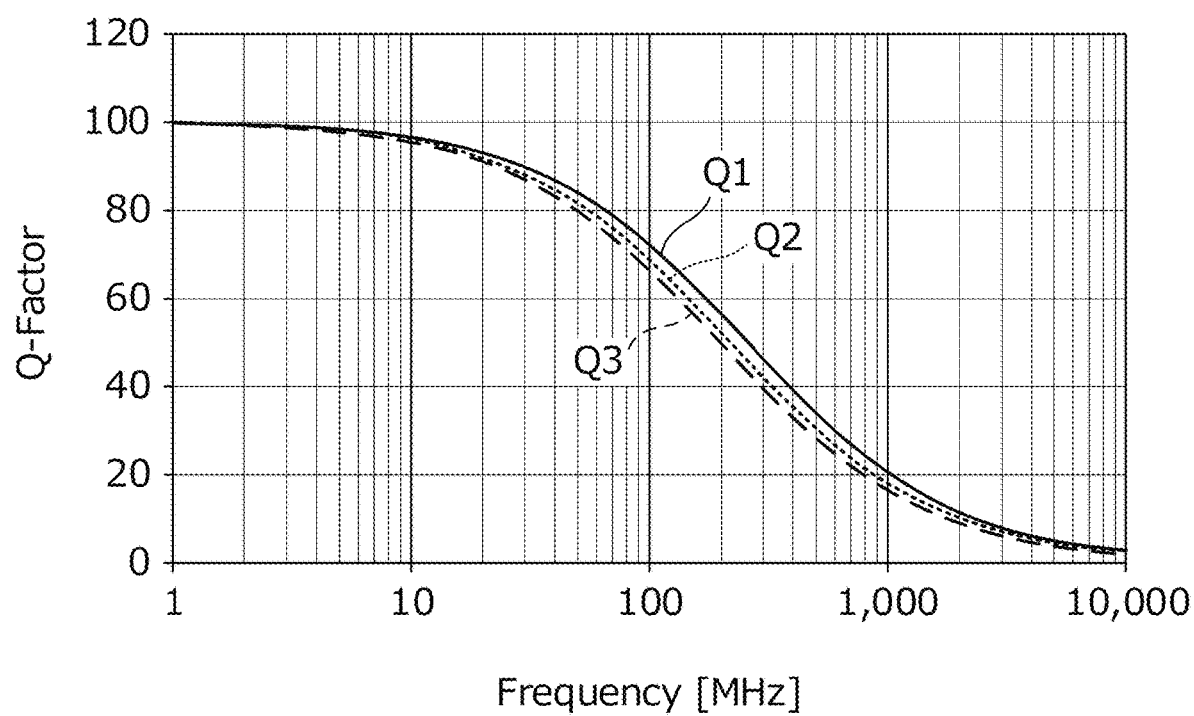
FIG. 5 is a graph illustrating frequency characteristics of Q-factors of the capacitive element 101 of the first exemplary embodiment and a capacitive element having a related-art structure.

FIG. 5 is a graph illustrating frequency characteristics of Q-factors of the capacitive element 101 of the exemplary embodiment and a capacitive element having a related-art structure. In FIG. 5, Q1 represents a characteristic of the capacitive element 101 of the present embodiment, Q2 represents a characteristic of a capacitive element of a first comparative example, and Q3 represents a characteristic of a capacitive element of a second comparative example.

Figure 19A:
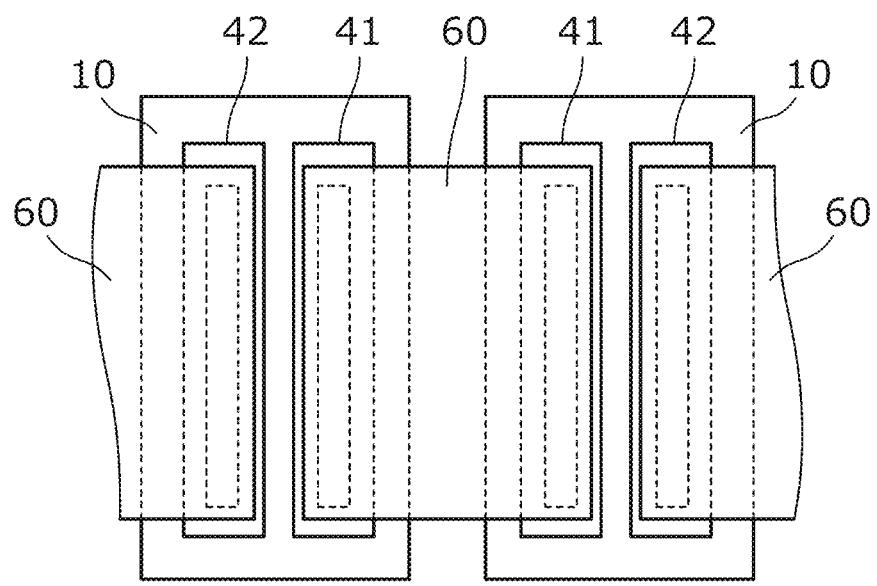
FIG. 19A is a plan view of a schematic structure of a capacitive element disclosed in Japanese Patent No. 4535817.
Figure 19B:
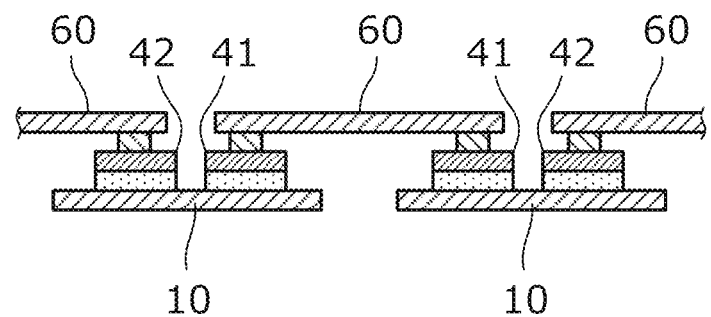
FIG. 19B is a sectional view of a schematic structure of the capacitive element disclosed in Japanese Patent No. 4535817.
Figure 20:
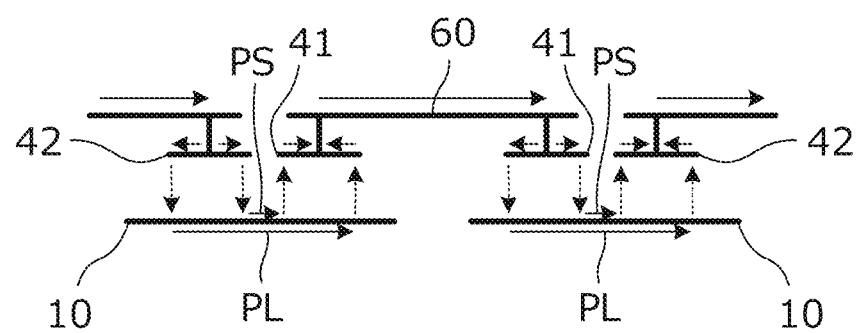
FIG. 20 is a view illustrating an example of an orientation of currents flowing through respective electrodes of the capacitive element having the structure disclosed in Japanese Patent No. 4535817.

The capacitive element of the first comparative example is a capacitive element having a shape in which one side of the first upper electrode and one side of the second upper electrode intermesh with each other as disclosed in Japanese Patent No. 4738182. The capacitive element of the second comparative example is a capacitive element having a structure in which a plurality of sets, each of which includes the lower electrode, the first upper electrode, and the second upper electrode, are disposed in a row as illustrated in FIGS. 19A and 19B.

The size of each electrode is determined such that the capacitances to be obtained of all of the capacitive element 101 of the exemplary embodiment, the capacitive element of the first comparative example, and the capacitive element of the second comparative example are equal to each other. It is noted that the interval between the first upper electrodes and the second upper electrodes adjacent to each other is under the same condition.

Here, if the ESR of the capacitive element is expressed as R and the capacitance is expressed as C, the impedance Z of the capacitive element is expressed as follows:

$$Z=R+jX$$

$$X=1/(2\Pi fC)$$

Since the Q-factor of the capacitive element is expressed by $Q=X/R$, as illustrated in FIG. 5, the Q-factor is reduced as the frequency is increased.

Since the capacitive element 101 of the present embodiment has low ESR, the Q-factor of the capacitive element 101 of the present embodiment is higher than the Q-factors of the two comparative examples described above.

Second Exemplary Embodiment

In a second exemplary embodiment, an example of a variable capacitive element including a bias voltage application circuit is illustrated.

Figure 6:
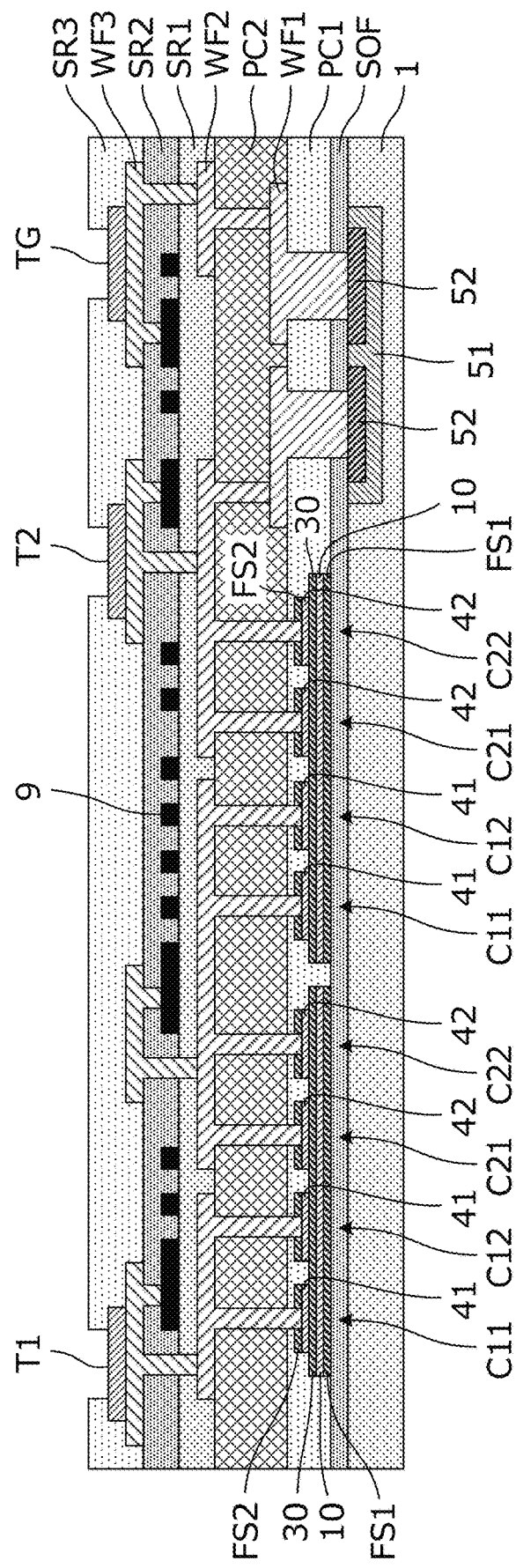
FIG. 6 is a sectional view of a main portion of a variable capacitive element 102 according to a second exemplary embodiment.

FIG. 6 is a sectional view of a main portion of a variable capacitive element 102 according to the second embodiment. FIGS. 7A to 10D are sectional views of respective steps of a manufacturing process of the variable capacitive element 102 shown in FIG. 6.

The variable capacitive element 102 of the exemplary embodiment is an element in which various patterns are provided on the substrate 1 by a thin film process, as illustrated in FIG. 6. In FIG. 6, the substrate 1 is a Si substrate of which a $SiO_2$ film SOF is provided on the surface. A ferroelectric film FS1, the lower electrode 10, the dielectric layer 30, the first upper electrode 41, the second upper electrode 42, and a ferroelectric film FS2 are provided on the substrate 1 in this order. In this manner, eight capacitance generating portions (two sets of capacitance generating portions C11, C12, C21, and C22) are provided.

All of the lower electrode 10, the first upper electrode 41, and the second upper electrode 42 are, for example, Pt films or metal films mainly composed of Pt. The lower electrode 10, the first upper electrode 41, and the second upper electrode 42 may be Au films or the like. The dielectric layer 30 is a ferroelectric film such as $(Ba,Sr)TiO_3$ (BST). Similarly, the ferroelectric films FS1 and FS2 are ferroelectric films such as a BST film.

The upper portion of the two sets of capacitance generating portions C11, C12, C21, and C22 and the upper portion of the substrate 1 are covered with a moisture-resistant protective film PC1 such as a $SiO_2$ film. An organic protective film PC2 such as polybenzoxazole (PBO) resin is provided on the upper portion of the moisture-resistant protective film PC1.

A wiring conductor film WF2 is provided on the upper portion of the organic protective film PC2. In addition, the wiring conductor film WF2 is connected to a predetermined part of the first upper electrode 41 and the second upper electrode 42 through a contact hole. Further, the wiring conductor film WF2 is connected to a wiring conductor film WF1 to be described below through a contact hole.

Moreover, an interlayer insulation film SR1 is provided on the surface of the wiring conductor film WF2. A resistance element 9 is provided on the surface of the interlayer insulation film SR1.

According to an exemplary aspect, a resistive film of the resistance element 9 is provided by a thin film process (e.g., process using photolithography and etching techniques) or a thick film process (e.g., process using a printing technique such as screen printing). A resistance value of each resistance element is determined by a width, a length, and a thickness of a pattern of the resistive film.

An interlayer insulation film SR2 is provided on the surface of the interlayer insulation film SR1. A wiring conductor film WF3 is provided on the surface of the interlayer insulation film SR2. In addition, the wiring conductor film WF3 is connected to the wiring conductor film WF2 through a contact hole provided in the interlayer insulation films SR1 and SR2.

As further shown, the surface of the interlayer insulation film SR2 is covered with a solder resist film SR3. Terminals T1, T2, TG, and the like are provided in the opening of the solder resist film SR3 and on the surface of the wiring conductor film WF3.

The ferroelectric film FS1 is an insulation film for adhesion and diffusion prevention with respect to the $SiO_2$ film SOF and the moisture-resistant protective film PC1. In addition, the ferroelectric film FS2 is an insulation film for adhesion with respect to the moisture-resistant protective film PC1.

In an exemplary aspect, the wiring conductor films WF2 and WF3 are composed of three layers of Ti/Cu/Ti, the thickness of the Ti layer is, for example, 100 nm, and the thickness of the Cu layer is, for example, 1000 nm.

The terminals T1, T2, TG, and the like are composed of two layers of Au/Ni, the thickness of the Ni layer as a lower layer is, for example, 2000 nm, and the thickness of the Au layer as an upper layer is, for example, 200 nm.

The moisture-resistant protective film PC1 is configured to prevent moisture emitted from the organic protective film PC 2 from entering the capacitive element part. For the moisture-resistant protective film PC1, SiNx, $Al_2O_3$, $TiO_2$, or the like can be used in addition to the above-described $SiO_2$. In addition, the organic protective film PC2 absorbs mechanical stress from the outside. For the organic protective film PC2, polyimide resin, epoxy resin, or the like can be used in addition to the above-described PBO resin.

A resistance material of the resistance element 9 is, for example, an alloy mainly composed of Ni and Cr.

As the thin film material used for the dielectric layer 30 and the ferroelectric films FS1 and FS2, dielectric materials having high dielectric constant, for example, a perovskite compound such as $SrTiO_3$, $BaTiO_3$, and $Pb(Zr,Ti)O_3$, and a bismuth layered compound such as $SrBi_4Ti_4O_{15}$ can be used in addition to the BST.

In the wiring conductor film WF2, a part where the first upper electrodes 41 are connected to each other corresponds to the "first wiring conductor" according to the exemplary embodiment of the present disclosure, and a part where the second upper electrodes 42 are connected to each other corresponds to the "second wiring conductor" according to the exemplary embodiment of the present disclosure.

For the wiring conductor films WF2 and WF3, an Al film can be used in addition to the above-described Ti/Cu/Ti film.

An N-type diffusion region 51 is provided on the substrate 1, and two P-type diffusion regions 52 are provided within the N-type diffusion region 51. The wiring conductor film WF1 is provided on the moisture-resistant protective film PC1, and the wiring conductor film WF1 is connected to the diffusion region 52 through the contact hole provided in the moisture-resistant protective film PC1 and the SiO$_2$ film SOF. An electro static discharge (ESD) protection element having a structure in which two Zener diodes having different directions are connected in series is configured by the diffusion regions 51 and 52. Only one ESD protection element is illustrated in the cross section of FIG. 6, but the variable capacitive element 102 has two sets of ESD protection elements.

Next, the manufacturing process of the variable capacitive element 102 will be described with reference to FIGS. 7A to 10D.

Figure 7A:
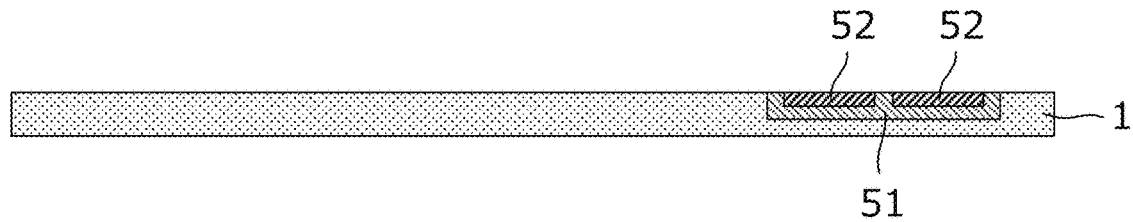
FIGS. 7A, 7B, 7C, and 7D are sectional views of respective steps of a manufacturing process of the variable capacitive element 102.

As illustrated in FIG. 7A, for example, ion implantation is performed on the substrate 1 to form the N-type diffusion region 51, and ion implantation is performed on the N-type diffusion region 51 to form the two P-type diffusion regions 52.

Figure 7B:

Then, as illustrated in FIG. 7B, the SiO$_2$ film SOF is provided on the surface of the substrate 1 by, for example, a chemical vapor deposition (CVD) method.

Figure 7C:
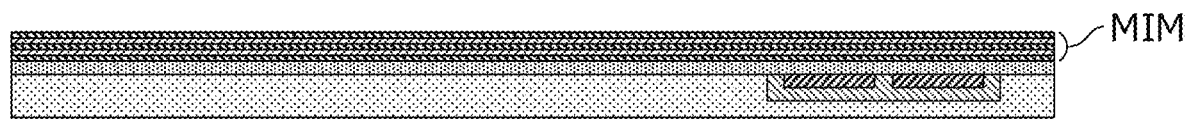

Then, as illustrated in FIG. 7C, the Pt film and the BST film are alternately provided on the SiO$_2$ film SOF to form a metal-insulator-metal (MIM) layer. The MIM layer is provided by repeating spin coating, baking, and sputtering.

Figure 7D:
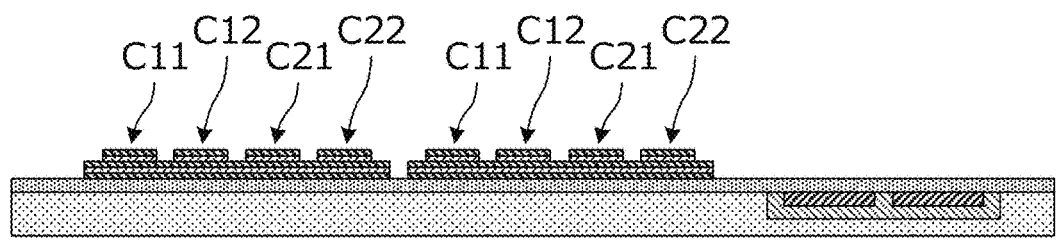

Then, as illustrated in FIG. 7D, the MIM layer is provided to have a predetermined pattern by an inductively coupled plasma-reactive ion etching (e.g., ICP-RIE) method, and is baked at a firing furnace.

Figure 8A:
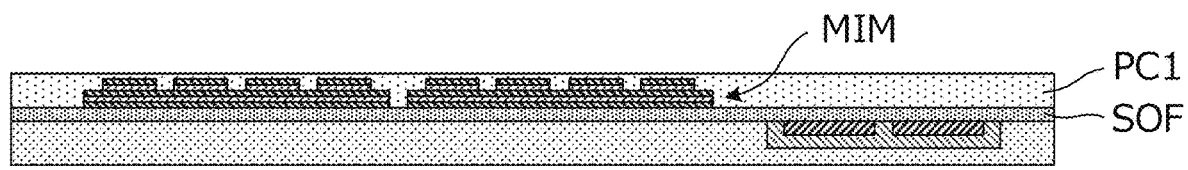
FIGS. 8A, 8B, 8C, and 8D are sectional views of respective steps of the manufacturing process of the variable capacitive element 102.

Next, as illustrated in FIG. 8A, the SiO$_2$ film SOF and the MIM layer are covered with the moisture-resistant protective film PC1 by sputtering using the SiO$_2$ film.

Figure 8B:
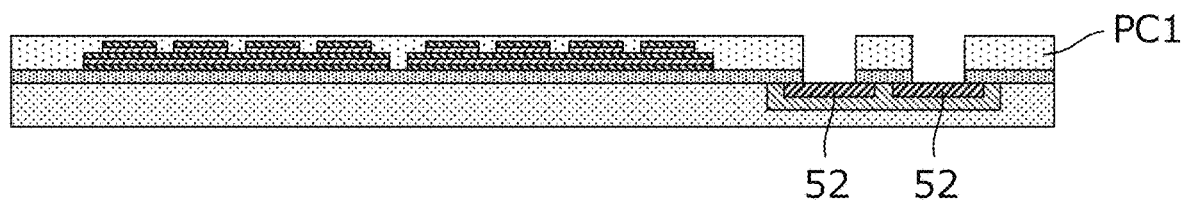

Then, as illustrated in FIG. 8B, the contact hole is provided on the diffusion region 52 by, for example, the ICE-RIE method.

Figure 8C:
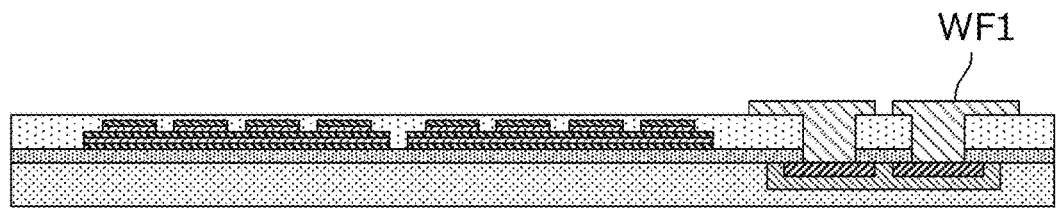

Then, as illustrated in FIG. 8C, the wiring conductor film WF1 is provided on the moisture-resistant protective film PC1 by, for example, sputtering using Al and the ICP-RIE.

Figure 8D:
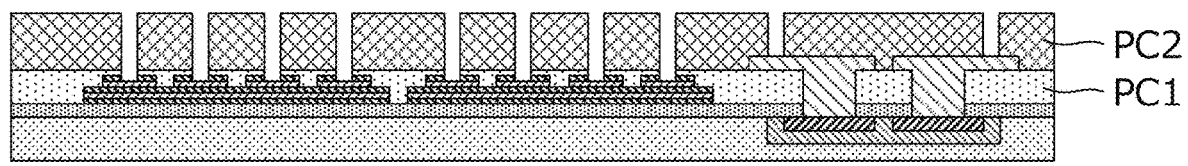

Then, as illustrated in FIG. 8D, the PBO is applied on the moisture-resistant protective film PC1 and the wiring conductor film WF1, the contact hole is provided by performing photolithography and curing, and the SiO$_2$ film SOF and the BST film of the MIM layer are processed by the ICP-RIE. In this manner, the organic protective film PC2 having a predetermined pattern is provided.

Figure 9A:
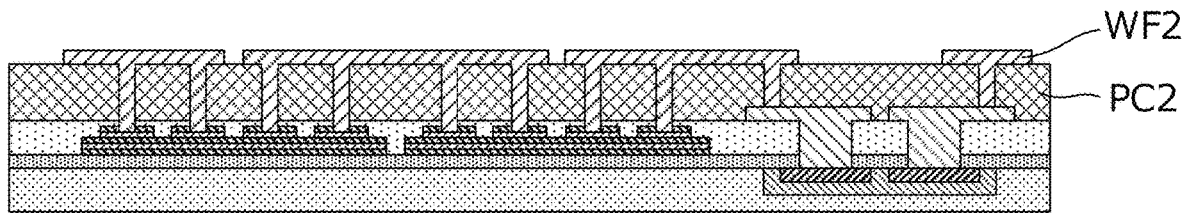
FIGS. 9A, 9B, 9C, and 9D are sectional views of respective steps of the manufacturing process of the variable capacitive element 102.

Next, as illustrated in FIG. 9A, the wiring conductor film WF2 is provided on the organic protective film PC2 by sputtering using Ti/Cu/Ti and a wet etching method.

Figure 9B:
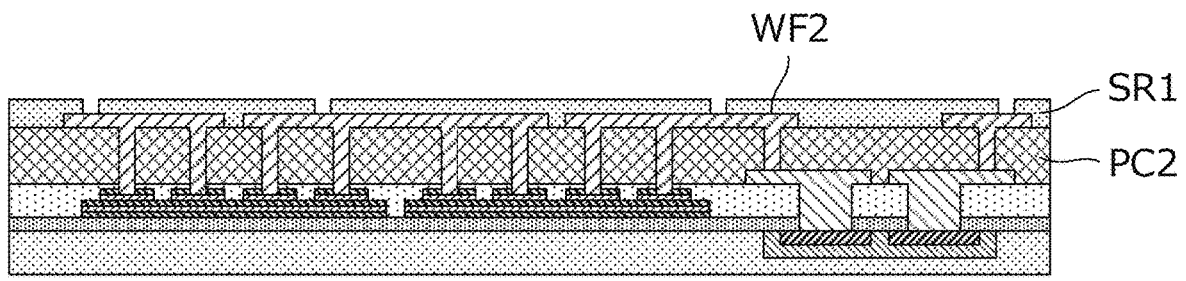

Then, as illustrated in FIG. 9B, the interlayer insulation film SR1 is provided by applying the solder resist film on the wiring conductor film WF2 and the organic protective film PC2 and by performing photolithography and curing.

Figure 9C:
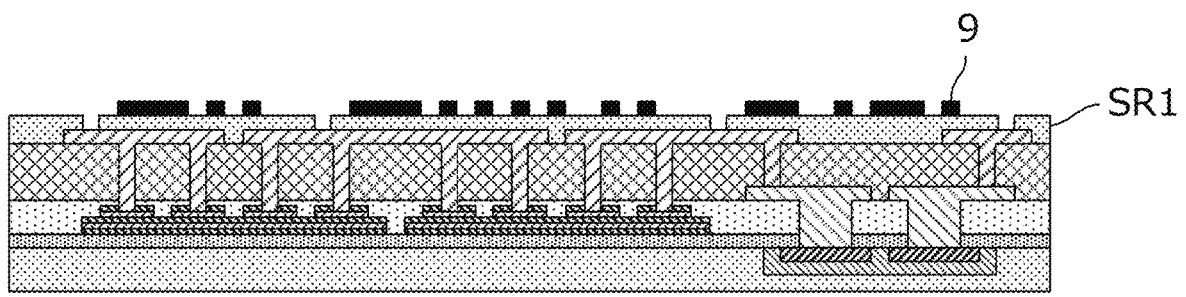

Then, as illustrated in FIG. 9C, a NiCrSi film is provided on the interlayer insulation film SR1 by using an electron-beam evaporation method, and is patterned to form the resistance element 9.

Figure 9D:
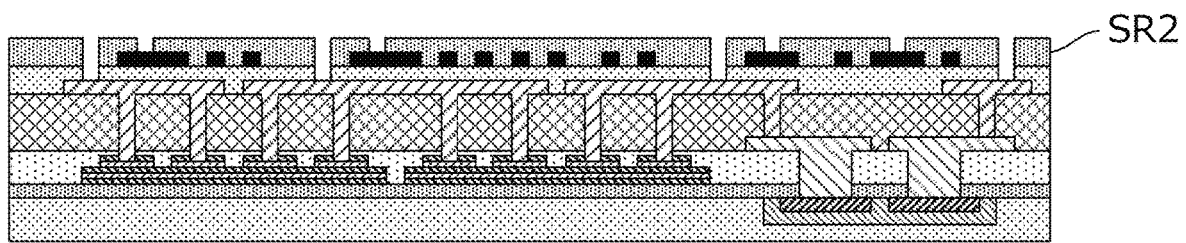

Then, as illustrated in FIG. 9D, the interlayer insulation film SR2 is provided by applying the solder resist film on the surface of the interlayer insulation film SR1 and the surface of the resistance element 9, and by performing photolithography and curing.

Figure 10A:
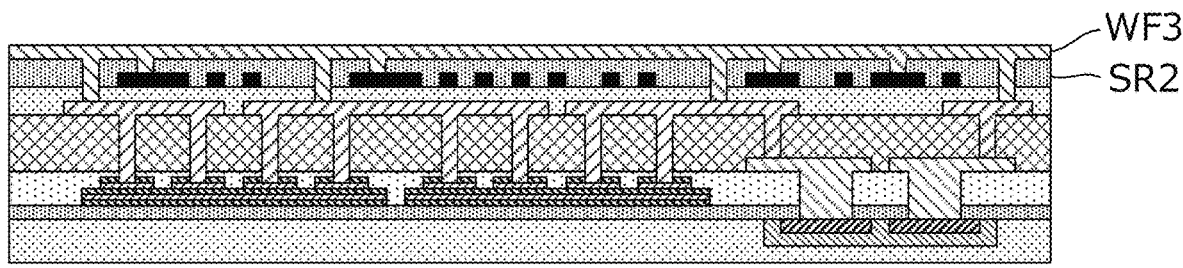
FIGS. 10A, 10B, 10C, and 10D are sectional views of respective steps of the manufacturing process of the variable capacitive element 102.

Next, as illustrated in FIG. 10A, the wiring conductor film WF3 is provided on the interlayer insulation film SR2 by sputtering using Ti/Cu/Ti and a wet etching method.

Figure 10B:
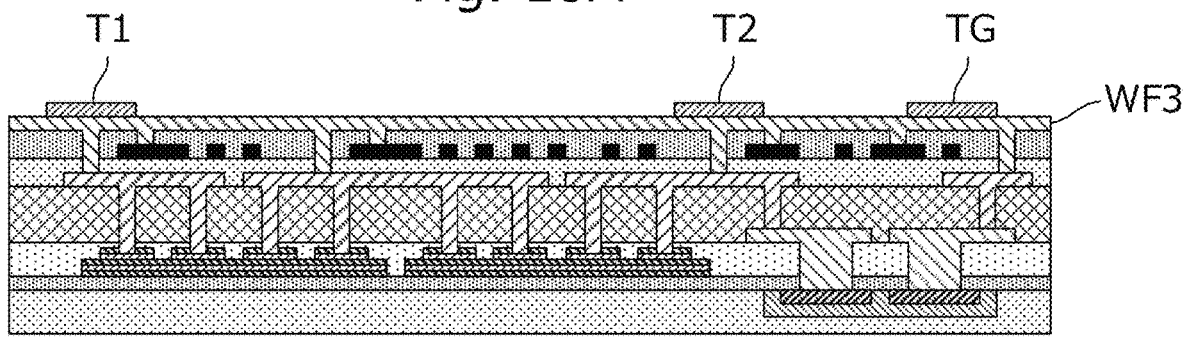

Then, as illustrated in FIG. 10B, the Au/Ni plated film is provided on the surface of the wiring conductor film WF3, and is patterned to form the terminals T1, T2, TG, and the like.

Figure 10C:
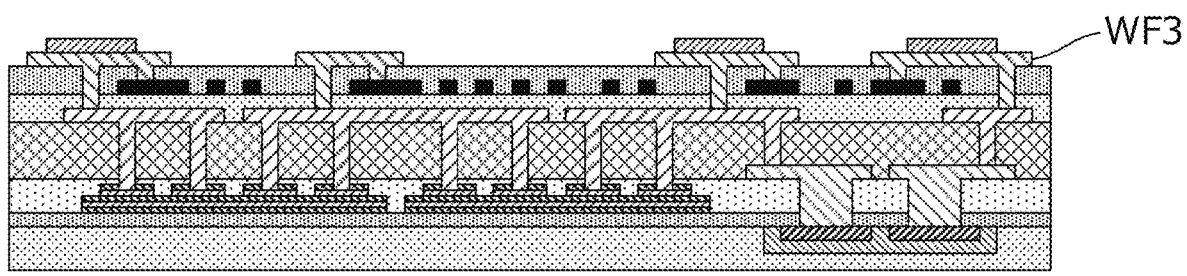

Then, as illustrated in FIG. 10C, the wiring conductor film WF3 is patterned by the wet etching method.

Figure 10D:
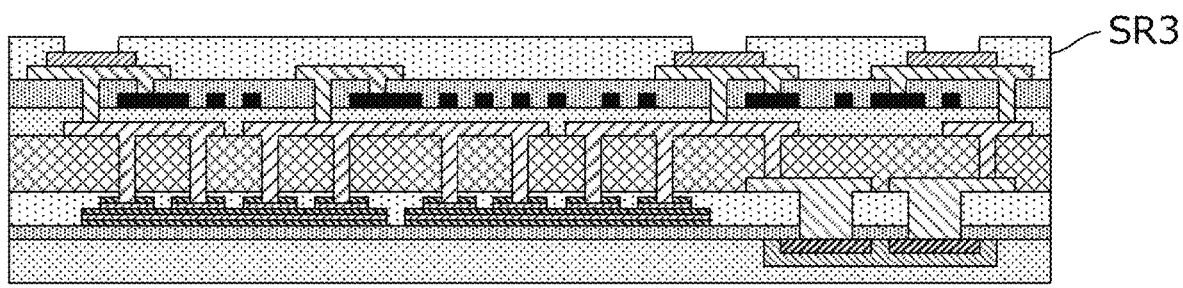

Finally, as illustrated in FIG. 10D, the solder resist film SR3 is provided by applying the solder resist film on the surfaces of the interlayer insulation film SR2, the wiring conductor film WF3, and the terminals T1, T2, TG, and the like and by performing photolithography and curing.

Figure 11A:
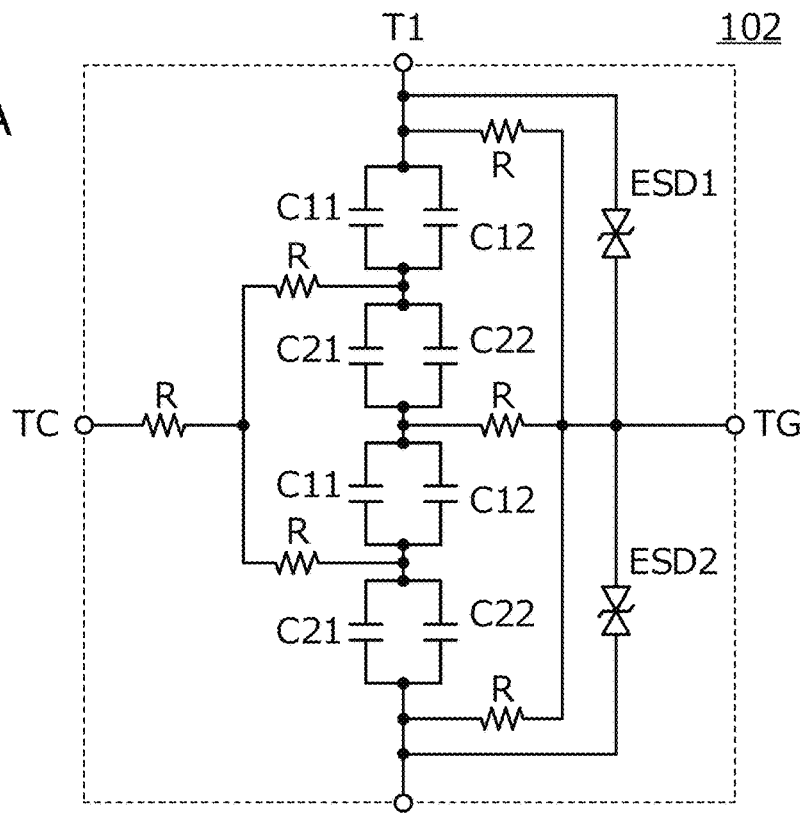
FIG. 11A is a circuit diagram of the variable capacitive element 102 of the second exemplary embodiment.

FIG. 11A is a circuit diagram of the variable capacitive element 102 of the exemplary embodiment. In FIG. 11A, the capacitance generating portions C11, C12, C21, and C22 are expressed by the capacitor symbol. The variable capacitive element 102 includes two sets of four capacitance generating portions (C11,C12,C21, and C22), that is, a total of eight capacitance generating portions, a plurality of resistance elements R, and ESD protection elements ESD1 and ESD2. The capacitance generating portions C11 and C12 are connected in parallel, the capacitance generating portions C21 and C22 are connected in parallel, and these two parallel connection portions are connected in series. The plurality of resistance elements R act as a voltage application path which applies direct current or low-frequency bias voltage to the plurality of capacitance generating portions.

The bias voltage is applied between the terminal TC and the terminal TG. The capacitance between the terminal T1 and the terminal T2 is determined according to the bias voltage.

Figure 11B:
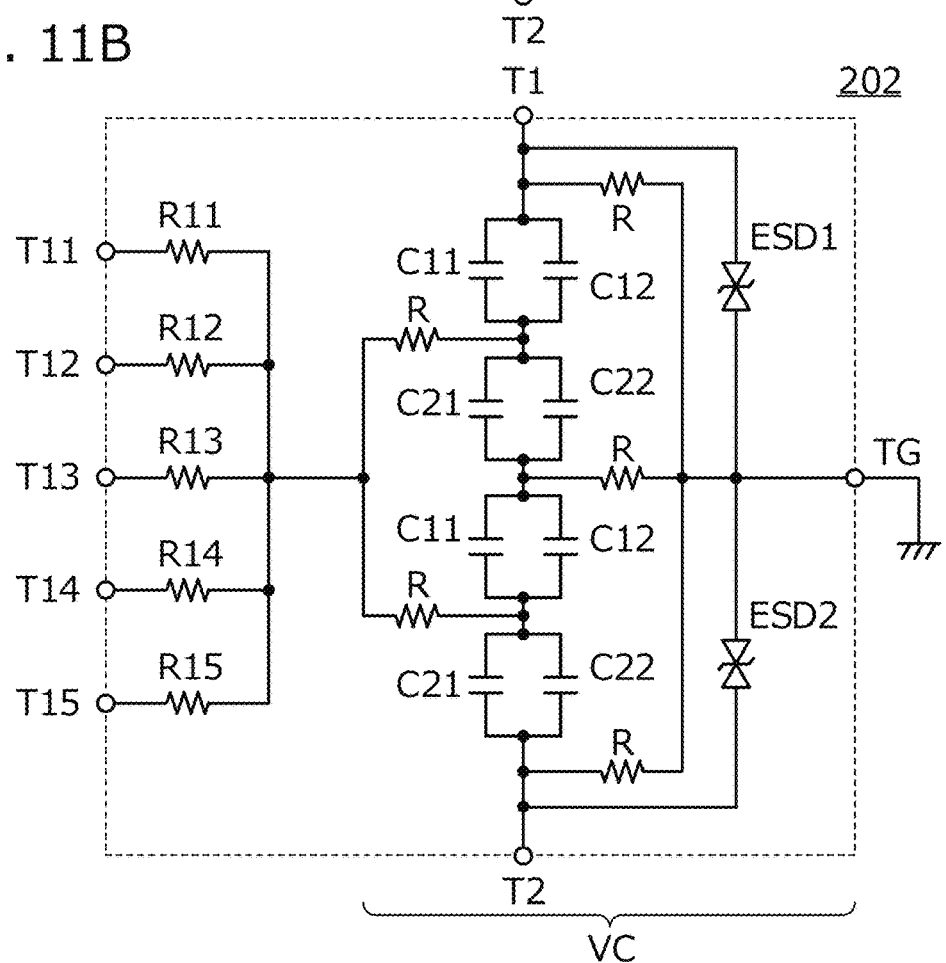
FIG. 11B is a circuit diagram of a variable capacitive element 202 including a resistor voltage dividing circuit that generates a bias voltage.

FIG. 11B is a circuit diagram of a variable capacitive element 202 including a resistor voltage dividing circuit that generates a bias voltage. In FIG. 11B, a variable capacitive element portion VC is the same as the circuit illustrated in FIG. 11A. The resistance values of the resistance elements R11 to R15 illustrated in FIG. 11B are determined by a ratio of a power of 2 based on the lowest value among the resistance values. For example, the ratio of the resistance values of the resistance elements R11, R12, R13, R14, and R15 is determined as 1:2:4:8:16. Therefore, by connecting the terminals T11 to T15 to a high level or to a low level, depending on the combination, the bias voltage to be applied to the variable capacitive element portion VC can have a value in 2 to the fifth power (i.e., equal to 32) ways.

Figure 12:
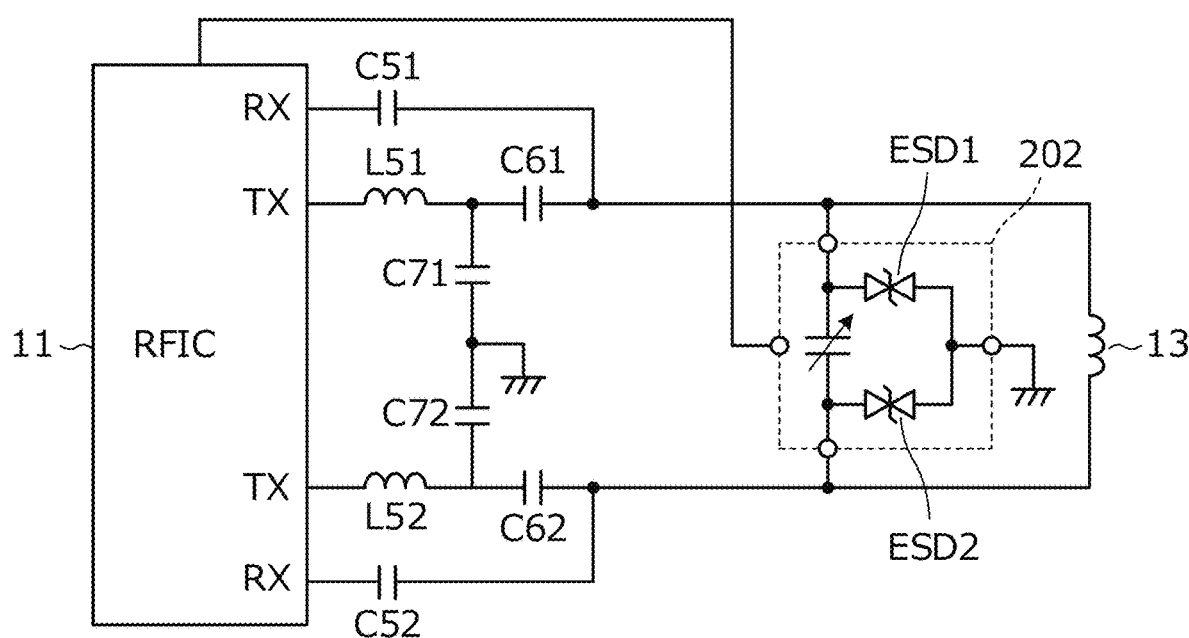
FIG. 12 is a diagram illustrating an example of a communication circuit including the variable capacitive element 202 of the second exemplary embodiment.

FIG. 12 is a diagram illustrating an example of a communication circuit including the variable capacitive element 202 of the exemplary embodiment. The communication circuit is a transceiver circuit for near field communication (NFC), for example. In FIG. 12, a circuit connected to two TX terminals (i.e., transmission signal terminals) of an RFIC 11 is also illustrated. In FIG. 12, capacitive elements C51 and C52 are coupling adjustment elements between the RFIC 11 and an antenna coil 13. In addition, inductors L51 and L52 and capacitive elements C61, C62, C71, C72 configure a transmission filter. For example, in a case where the communication circuit operates in a card mode, since the RFIC 11 operates passively, the RFIC 11 generates a power supply voltage from signals input to RX terminals, reads received signals, and performs load modulation of a circuit (load) connected to the TX terminals at the time of transmission. In addition, for example, when the communication circuit operates in a reader/writer mode, since the RFIC 11 operates actively, the RFIC 11 opens the RX terminal at the time of transmission to transmit a transmission signal from the TX terminal, and opens the TX terminal at the time of reception to receive a reception signal from the RX terminal. In the communication circuit, the impedance seen from the RFIC 11 to the antenna coil 13 side is changed according to such an operation mode. The capacitance of the variable capacitive element 202 is controlled such that, according to the operation mode, the resonant frequency of the antenna circuit is optimized, that is, matching of the impedance seen from the RFIC 11 to the antenna coil 13 side is attained.

As shown, the ESD protection elements ESD1 and ESD2 are respectively connected between the ground and both terminals of the variable capacitive element 202. The ESD protection elements ESD1 and ESD2 prevent an overvoltage from being applied to the RFIC 11 by bypassing the electrostatic discharge surge entering from the antenna coil 13 to the ground.

Third Exemplary Embodiment

In a third exemplary embodiment, an example of a variable capacitive element including a bias voltage application circuit is illustrated.

Figure 13:
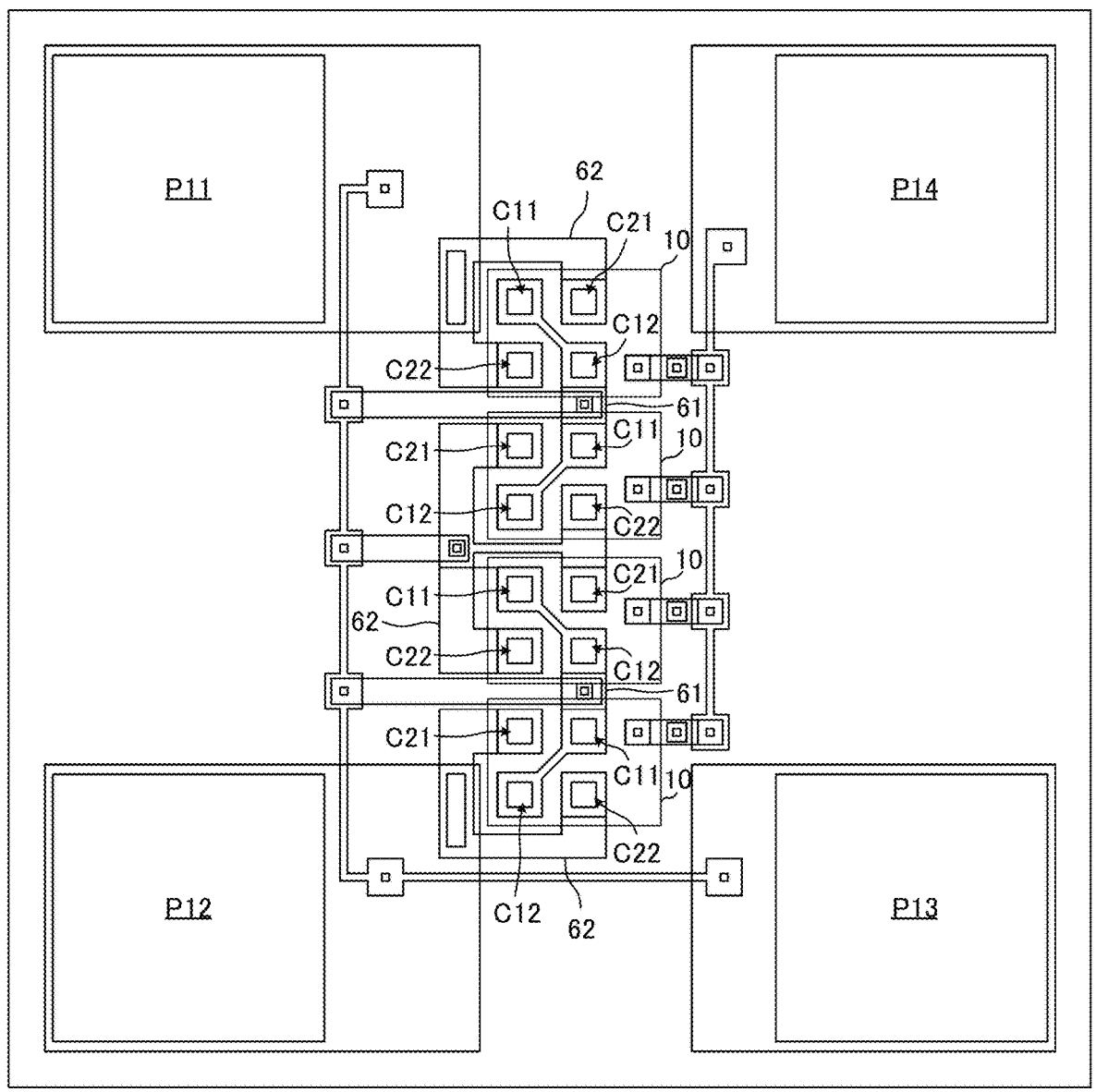
FIG. 13 is a plan view of a variable capacitive element 103 according to a third exemplary embodiment.
Figure 14:
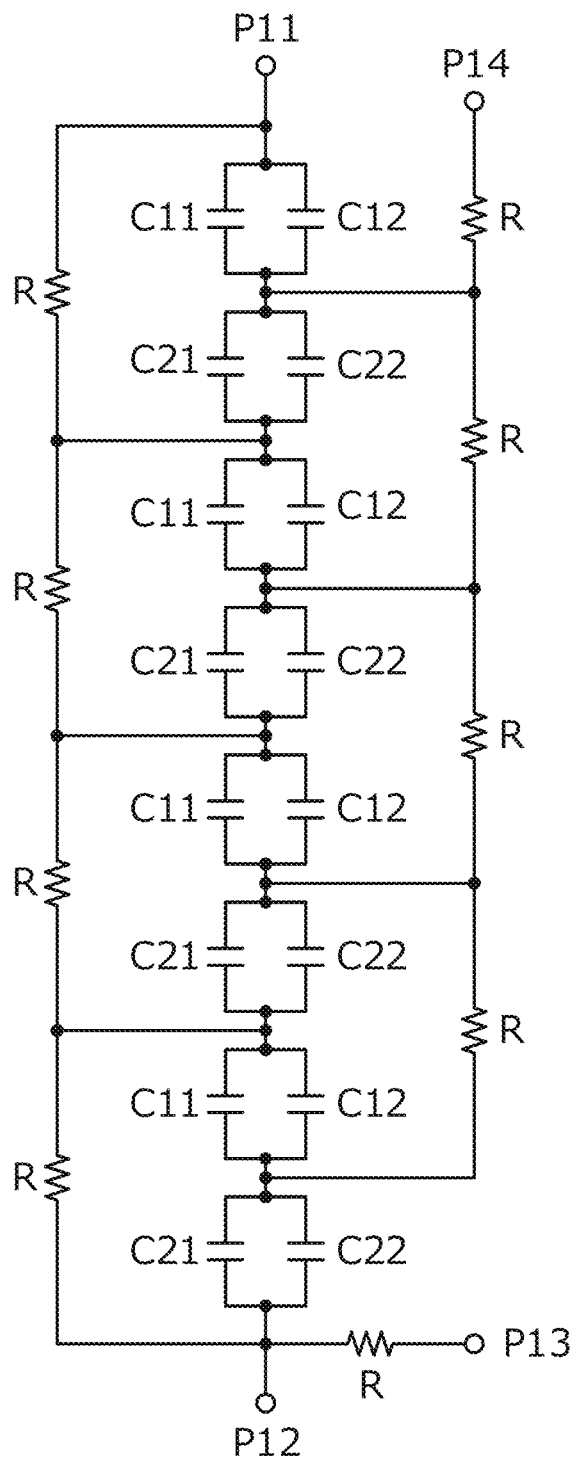
FIG. 14 is a circuit diagram of the variable capacitive element 103.

FIG. 13 is a plan view of a variable capacitive element 103, and FIG. 14 is a circuit diagram of the variable capacitive element 103. In FIG. 13, patterns of layers forming the variable capacitive element 103 are expressed in a superimposed manner. The pattern of each layer will be described below.

The cross-sectional structure of the variable capacitive element 103 of the exemplary embodiment is basically the same as the structure illustrated in FIG. 6 in the second embodiment. It is noted that the variable capacitive element 103 of the present embodiment does not include the ESD protection element.

As illustrated in FIG. 14, the variable capacitive element 103 of the present embodiment includes four sets of capacitance generating portions (C11, C12, C21, and C22), that is, a total of sixteen capacitance generating portions, and a plurality of resistance elements R.

Figure 15D:
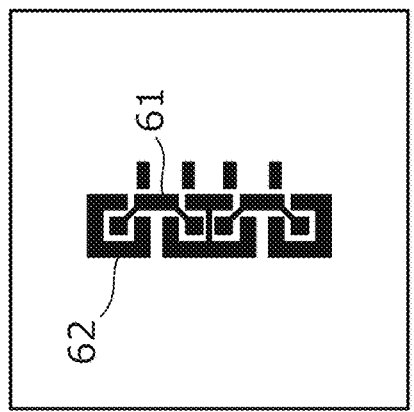
FIG. 15D is a plan view of a first wiring conductor 61 and a second wiring conductor 62.
Figure 15C:
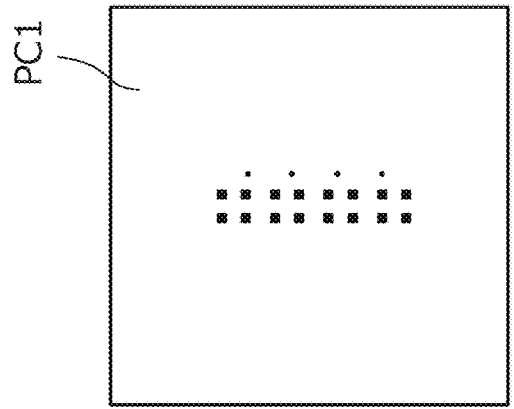
FIG. 15C is a plan view of a moisture-resistant protective film PC1.
Figure 15B:
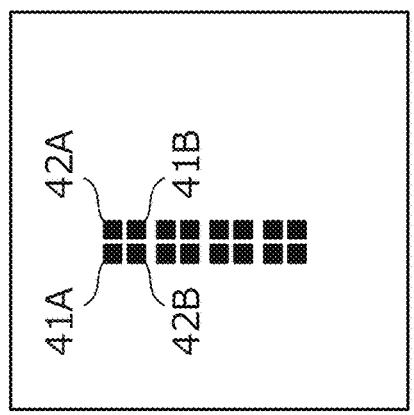
FIG. 15B is a plan view of upper electrodes 41A, 41B, 42A, and 42B.
Figure 15A:
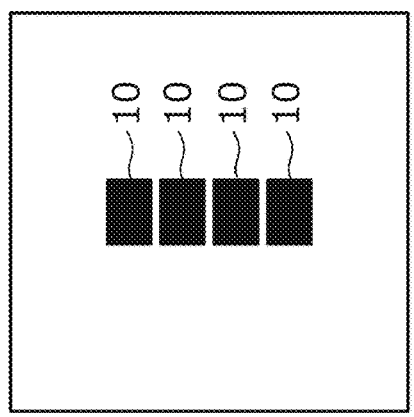
FIG. 15A is a plan view of lower electrodes 10.

FIGS. 15A to 17B are plan views of each layer of the variable capacitive element 103. As illustrated in FIG. 15A, the lower electrode 10 is provided at four positions. In addition, as illustrated in FIG. 15B, a set of the upper electrodes 41A, 41B, 42A, and 42B is provided at four positions. As illustrated in FIG. 15C, the moisture-resistant protective film PC1 is provided on the upper electrodes. As illustrated in FIG. 15D, a plurality sets of the first wiring conductor 61 and the second wiring conductor 62 are provided on the moisture-resistant protective film PC1.

The interlayer insulation film SR1 is provided on the wiring conductors, and as illustrated in FIG. 16B, the resistance elements 9 by the resistive film are provided on the interlayer insulation film SR1.

As illustrated in FIG. 16C, the interlayer insulation film SR2 is provided on the resistive film. As illustrated in FIG. 16D, the wiring conductor films WF3 for terminals and for resistive film connection are provided on the interlayer insulation film SR2.

As illustrated in FIG. 17A, Au/Ni plated films are provided at positions of the external connection electrodes P11, P12, P13, and P14 on the surface of the wiring conductor films for terminals. The layer where the Au/Ni plated film is provided is covered with the solder resist film SR3.

Fourth Exemplary Embodiment

In a fourth exemplary embodiment, a capacitive element of which the number of capacitance generating portions is larger than the number of the capacitance generating portions of some capacitive elements illustrated above will be described.

Figure 18:
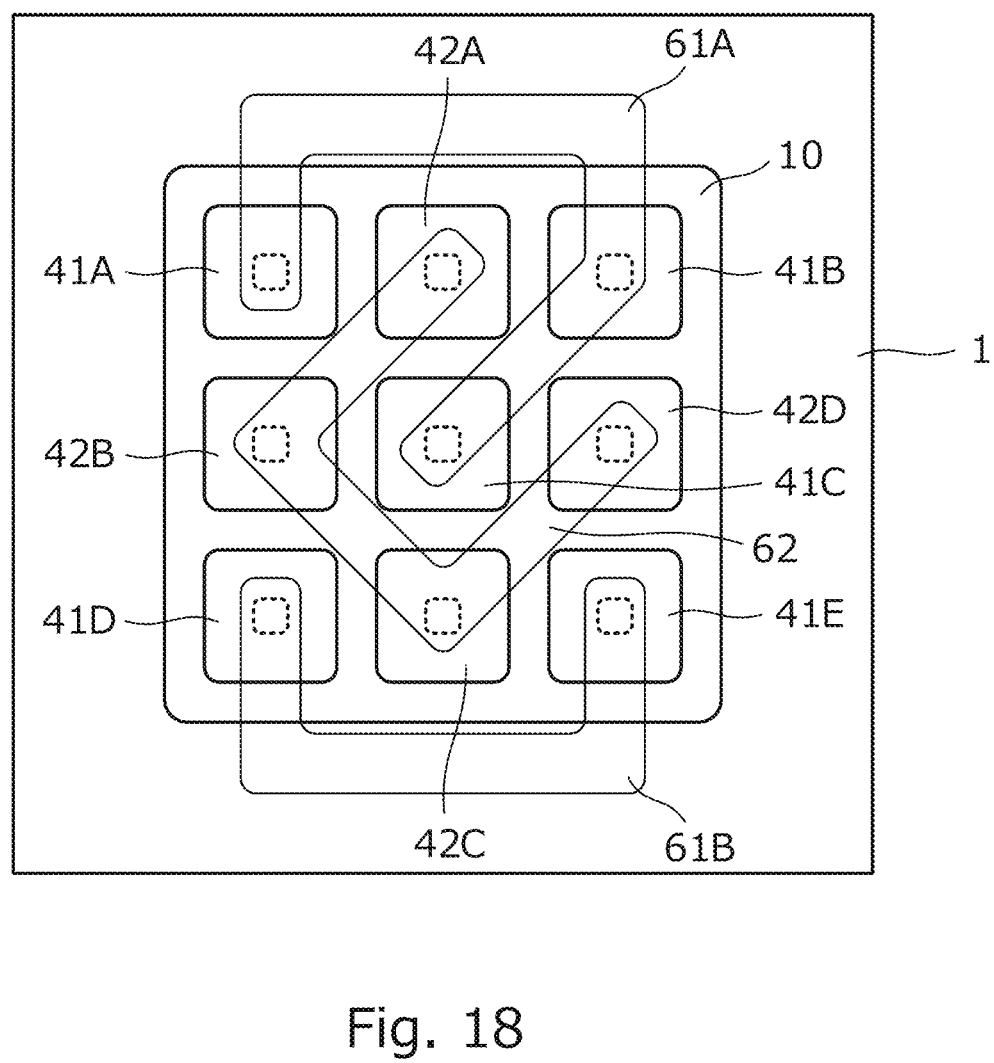
FIG. 18 is a plan view of a main portion of a capacitive element 104 according to a fourth exemplary embodiment.

FIG. 18 is a plan view of a main portion of a capacitive element 104 according to the fourth embodiment.

The capacitive element 104 includes a conductor, a dielectric, an insulator, and the like which are provided on the substrate 1. The substrate 1 has a surface extending in the X-axis direction and the Y-axis direction in the X-Y rectangular coordinate system. A lower electrode 10 is provided on the surface of the substrate 1. The dielectric layer is provided on the lower electrode 10, five first upper electrodes 41A, 41B, 41C, 41D, and 41E and four second upper electrodes 42A, 42B, 42C, and 42D are provided on the upper surface of the dielectric layer.

According to the exemplary aspect, a total of nine upper electrodes are disposed in the following relationship. First, in the surface direction along the lower electrode 10 and in the X-axis direction, the second upper electrode 42A is disposed between the first upper electrodes 41A and 41B. The first upper electrode 41C is disposed between the second upper electrodes 42B and 42D. The second upper electrode 42C is disposed between the first upper electrodes 41D and 41E. Further, in the surface direction along the lower electrode 10 and in the Y-axis direction, the second upper electrode 42B is disposed between the first upper electrodes 41A and 41D. The first upper electrode 41C is disposed between the second upper electrodes 42A and 42C. The second upper electrode 42D is disposed between the first upper electrodes 41B and 41E.

That is, the plurality of first upper electrodes and the plurality of second upper electrodes are disposed such that the first upper electrode and the second upper electrode are adjacent to each other in the surface direction along the lower electrode 10 and in the X-axis direction, and the first upper electrode and the second upper electrode are adjacent to each other in the surface direction along the lower electrode 10 and in the Y-axis direction.

According to the exemplary configuration, nine capacitance generating portions are provided by the lower electrode 10, the upper electrodes 41A to 41E and 42A to 42D, and the dielectric layer.

Moreover, the interval between the first upper electrode and the second upper electrode that are adjacent to each other is narrower than the interval between the adjacent first upper electrodes among the first upper electrodes 41A to 41E, and the interval between the adjacent second upper electrodes among the second upper electrodes 42A to 42D. For example, the interval between the first upper electrode 41A and the second upper electrode 42A is narrower than the interval between the first upper electrodes 41A and 41C, the interval between the second upper electrodes 42A and 42B, and the like.

First wiring conductors 61A and 61B and a second wiring conductor 62 are further provided on the substrate 1. A layer where the first wiring conductors 61A and 61B and the second wiring conductor 62 are provided is different from a layer where the upper electrodes 41A to 41E and 42A to 42D are provided.

The first upper electrodes 41A, 41B, and 41C are electrically connected to each other through the first wiring conductor 61A. In addition, the first upper electrodes 41D and 41E are electrically connected to each other through the first wiring conductor 61B. Further, the second upper electrodes 42A, 42B, 42C, and 42D are electrically connected to each other through the second wiring conductor 62. The first wiring conductors 61A and 61B are connected to each other on another layer. Moreover, the first wiring conductors 61A and 61B and the second wiring conductor 62 are each connected to an external electrode or another circuit.

In this manner, the first upper electrodes and the second upper electrodes are alternately disposed along one axis direction or along each of two axis directions to configure a capacitive element having five or more upper electrodes.

For example, the shape of the first upper electrode and the second upper electrode according to the exemplary embodiments is not limited to the square shape or roughly square shape, and may be a rectangular shape or a roughly rectangular shape.

It is noted that the "first axis direction" and the "second axis direction" according to the present disclosure are not limited to the orthogonal relationship, and may have a relationship in which the directions intersect at 60 degrees or 120 degrees.

Finally, it is noted that the foregoing exemplary embodiments are illustrative in all points and should not be construed to limit the present invention. It is to be understood that variations and modifications will be apparent to those skilled in the art without departing from the scope and spirit of the present invention. The scope of the present invention is defined not by the foregoing preferred embodiments but by the following claims. Further, the scope of the present invention is intended to include all possible changes and modifications from the preferred embodiments within the scopes of the claims and the scopes of equivalents. While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed:

1. A capacitive element comprising:
   a substrate;
   a lower electrode disposed on the substrate;
   a plurality of first upper electrodes disposed to face the lower electrode;
   a plurality of second upper electrodes disposed to face the lower electrode;
   a dielectric layer disposed between the lower electrode and the plurality of first and second upper electrodes;
   a first wiring conductor that electrically connects the plurality of first upper electrodes; and
   a second wiring conductor that electrically connects the plurality of second upper electrodes,
   wherein a portion of the plurality of first and second upper electrodes are disposed adjacent to each other in a surface direction along the lower electrode and in a first axis direction, and
   wherein a portion of the plurality of first and second upper electrodes are disposed adjacent to each other in the surface direction along the lower electrode and in a second axis direction.

2. The capacitive element according to claim 1, further comprising a first interval between the first and second upper electrodes that are adjacent to each other in the first axis direction that is substantially a same length as a second interval between the first and second upper electrodes that are adjacent to each other in the second axis direction.

3. The capacitive element according to claim 1, wherein the first wiring conductor and the second wiring conductor comprise a sheet resistance that is lower than a sheet resistance of the lower electrode.

4. The capacitive element according to claim 3, wherein the lower electrode comprises a metal including Pt, and the first and second wiring conductors comprise a metal including either Cu or Al.

5. The capacitive element according to claim 1,
   wherein the dielectric layer is a ferroelectric layer,
   wherein a capacitance between the lower electrode and the first upper electrodes is defined by a bias voltage applied between the lower electrode and the first upper electrodes, and
   wherein a capacitance between the lower electrode and the second upper electrodes is defined by a bias voltage applied between the lower electrode and the second upper electrodes.

6. The capacitive element according to claim 5, further comprising a bias voltage application resistance element disposed at the substrate and configured to define a bias voltage path through which the respective bias voltages are applied between the lower electrode and each of the first and second upper electrodes.

7. The capacitive element according to claim 5, further comprising a bias voltage generation circuit disposed at the substrate and including:
   a plurality of voltage dividing resistance elements having different resistance values; and
   a control voltage input configured to receive a plurality of control voltages that are applied to the plurality of voltage dividing resistance elements.

8. The capacitive element according to claim 7, wherein the bias voltage generation circuit is configured to output the bias voltage according to the voltages that are applied to the control voltage input.

9. The capacitive element according to claim 8, wherein the resistance values of each of the plurality of voltage dividing resistance elements having different resistance values in accordance with a ratio of a power of 2 based on a lowest value among the resistance values.

10. The capacitive element according to claim 1, further comprising first and second external electrodes, with the first wiring conductor electrically connected to the first external electrode and the second wiring conductor electrically connected to the second external electrode.

11. The capacitive element according to claim 1, wherein the first and second axis directions orthogonally intersect each other in the surface direction.

12. A capacitive element comprising:
    a substrate;
    a lower electrode disposed on the substrate;
    a dielectric layer disposed above the lower electrode;
    a plurality of first upper electrodes disposed above the dielectric layer and facing the lower electrode, with the plurality of first upper electrodes electrically connected to each other by a first wiring electrode;
    a plurality of second upper electrodes disposed above the dielectric layer and facing the lower electrode, with the plurality of second upper electrodes electrically connected to each other by a second wiring electrode;
    wherein a respective first pair of electrodes of the plurality of first and second upper electrodes are disposed at a first interval from one another and along a first axis direction extending parallel to a surface of the lower electrode,
    wherein a respective second pair of electrodes of the plurality of first and second upper electrodes are disposed at a second interval from one another and along a second axis direction extending parallel to the surface of the lower electrode, and wherein the second axis direction is different than the first axis direction.

13. The capacitive element according to claim 12, wherein the first interval between the respective first pair of electrodes is substantially a same length as the second interval between the respective second pair of electrodes.

14. The capacitive element according to claim 12, wherein the first wiring conductor and the second wiring conductor comprise a sheet resistance that is lower than a sheet resistance of the lower electrode.

15. The capacitive element according to claim 14, wherein the lower electrode comprises a metal including Pt, and the first and second wiring conductors comprise a metal including either Cu or Al.

16. The capacitive element according to claim 12,
wherein the dielectric layer is a ferroelectric layer,
wherein a capacitance between the lower electrode and the first upper electrodes is defined by a bias voltage applied between the lower electrode and the first upper electrodes, and
wherein a capacitance between the lower electrode and the second upper electrodes is defined by a bias voltage applied between the lower electrode and the second upper electrodes.

17. The capacitive element according to claim 16, further comprising a bias voltage application resistance element disposed at the substrate and configured to define a bias voltage path through which the respective bias voltages are applied between the lower electrode and each of the first and second upper electrodes.

18. The capacitive element according to claim 16, further comprising a bias voltage generation circuit disposed at the substrate and including:
  a plurality of voltage dividing resistance elements having different resistance values; and
  a control voltage input configured to receive a plurality of control voltages that are applied to the plurality of voltage dividing resistance elements,
wherein the bias voltage generation circuit is configured to output the bias voltage according to the voltages that are applied to the control voltage input.

19. The capacitive element according to claim 12, further comprising first and second external electrodes, with the first wiring conductor electrically connected to the first external electrode and the second wiring conductor electrically connected to the second external electrode.

20. The capacitive element according to claim 12, wherein the first and second axis directions orthogonally intersect each other relative to the surface of the lower electrode.

\* \* \* \* \*